United States Patent [19]

Chalik

[11] Patent Number: 4,719,813
[45] Date of Patent: Jan. 19, 1988

[54] GEAR ASSEMBLY

[76] Inventor: Lazar Chalik, 10 Edgebrook Dr., West Hartford, Conn. 06117

[21] Appl. No.: 868,143

[22] Filed: May 28, 1986

Related U.S. Application Data

[62] Division of Ser. No. 546,726, Oct. 28, 1983, Pat. No. 4,612,816.

[51] Int. Cl.⁴ .......................... F16H 55/20; F16H 1/14
[52] U.S. Cl. ........................................ 74/409; 74/410; 74/417; 74/440
[58] Field of Search ................. 74/409, 410, 440, 417, 74/423, 459.5

[56] References Cited

U.S. PATENT DOCUMENTS

| | | | |
|---|---|---|---|
| 1,678,582 | 7/1928 | Allen | 74/410 |
| 1,848,342 | 3/1932 | Gleason | 74/459.5 |
| 2,418,555 | 4/1947 | Kirsten | 74/410 |
| 2,475,283 | 7/1949 | Hendrickson | 74/410 |
| 3,011,365 | 12/1961 | Stoeckicht | 74/410 |
| 3,548,673 | 12/1970 | Suchocki | 74/417 |
| 3,636,789 | 1/1972 | Geiger | 74/409 |
| 4,369,668 | 1/1983 | Pollak-Banda et al. | 74/410 |

FOREIGN PATENT DOCUMENTS

| | | | |
|---|---|---|---|
| 2752979 | 6/1978 | Fed. Rep. of Germany | 74/411 |
| 2751360 | 5/1979 | Fed. Rep. of Germany | 74/417 |
| 19259 | of 1913 | United Kingdom | 74/459.5 |
| 264273 | 1/1927 | United Kingdom | 74/440 |

*Primary Examiner*—Rodney H. Bonck
*Assistant Examiner*—David A. Testardi

[57] ABSTRACT

A gear assembly for high-speed transmission between either two parallel shafts or two intersecting shafts comprising two meshing gears, one mounted to a drive shaft and the other mounted to a driven shaft, each of the gears having coaxially disposed first and second toothed portions which differ from each other in that the teeth of the first toothed portion are cut at a first inclination angle and the teeth of the second toothed portion are cut at a second inclination angle different from the first inclination angle. One of the meshing gears is fixed to its shaft so as to be non-displaceable axially, while the other is mounted so as to be axially displaceable with respect to the fixed gear. Preloading means engaging the movable gear are provided for applying an axially directed load to the movable floating gear thereby urging the floating gear against the fixed gear so as to eliminate the free angular displacement of the gears with respect to each other within backlash and to preclude tooth disengagement under axial forces which are imposed on the floating gear by external peripheral loads.

5 Claims, 10 Drawing Figures

GEAR ASSEMBLY

This is a divisional of co-pending application (Ser. No. 546,726, filed on Oct. 28, 1983, and now U.S. Pat. No. 4,612,816

BACKGROUND OF THE INVENTION

The present invention relates to gearing for high-speed transmission and, more particularly, to high-speed gears having two toothed portions juxtadisposed on a shaft for use in applications wherein the absorption of dynamic loads, the elimination of backlash and the minimizing of noise and vibration are critical.

In certain high-speed applications, for example in turbomachinery, gears may be subjected to high dynamic loads. Unavoidable inaccuracies in the teeth mesh due to tolerance, as well as errors in manufacturing and assembly, lead to high-frequency periodical accelerations of the driven gear which result in the imposition of acceleration forces on the meshing teeth. Due to the presence of backlash between non-working teeth flanks, the acceleration of the driven gear leads also to separation of the working teeth followed by a reengagement thereof resulting in an impact load being imposed on the gear teeth. This phenomenon, known as free impact or hammering, results high dynamic loading on the gear teeth with attendant noise generation and vibrations occurring. Additionally, in symmetrical double helical or herringbone type gears, the teeth meshing errors cause the uneven distribution of applied load between the two toothed portions of the gear. Accordingly, efforts have been made when designing double toothed helical gears to eliminate or at least to reduce these disadvantages.

For example, in U.S. Pat. No. 2,982,146 there is disclosed a gear mechanism wherein one gear is axially fixed while the other gear is free move axially along its shaft or axially together with its shaft. Each gear is comprised of two assymmetric toothed portions with the teeth on one toothed portion having a helix angle of less than 45° pitched in one direction while the teeth on the other toothed portion has a helix angle of more than 45° pitched in the opposite direction. The free floating gear serves to distribute a transmitted load between the two toothed portions of the gear in inverse proportion to the relationship between the tangents of the two helix angles, the load on both toothed portions of each gear being applied in the same direction. Because the substantially greater part of applied load is taken-up permanently by the toothed portion having the lesser helix angle, this gearing is less sensitive to the variations of load-distribution due to mesh errors than is gearing of the symmetrical herringbone type. However, this gearing is still subject to hammering due to the absence of backlash take-up capability.

An example of anti-backlash gearing is presented in U.S. Pat. No. 3,648,534. As disclosed therein, one of the meshing gears is split gear having two toothed portions which are not integral but rather are angularly adjustable. One of the toothed portions of the split gear is fixed to the shaft while the other to free to rotate about the shaft under the influence of a brasing means which controls the angular displacement between the two portions of the split gear. The biasing means imposes an additional load on the gear teeth which permanently acts on the teeth and can lead to undue wear and gear loadings particularly in high speed applications.

U.S. Pat. No. 4,036,074 discloses anti-backlash gearing of the split gear type wherein the split gear has two toothed portions whose teeth have the same helix angle and pitch direction. One portion is fixed to the shaft while the other portion is axially movable along the shaft and separated therefrom by spring biasing means. The spring means serve to urge the movable toothed portion of the split gear away from the fixed toothed portion of the split gear. The maximum displacement of the movable portion away from the fixed portion is preadjusted to a preselected distance to limit backlash. Although, this gear arrangement subject to reduced backlash, backlash still exists and, in fact, actually varies from one pair of engaging teeth to the next pair of engaging teeth.

It is the primary object of the present invention to provide a gear assembly having meshing gears of the double toothed portion type wherein the free impact (hammering) of teeth is eliminated without imposing additional loading on the teeth.

SUMMARY OF THE INVENTION

A gear assembly for high-speed transmission between either two parallel shafts or two intersecting shafts comprising two meshing gears, one mounted to a drive shaft and the other mounted to a driven shaft, each of the gears having coaxially disposed first and second toothed portions which differ from each other in that the teeth of the first toothed portion are cut at a first inclination angle and the teeth of the second toothed portion are cut at a second inclination angle different from the first inclination angle. One of the meshing gears is fixed to its shaft so as to be non-displaceable axially, while the other is mounted so as to be axially displaceable with respect to the fixed gear. Preloading means engaging the movable gear are provided for applying an axially directed load to the movable floating gear thereby urging the floating gear against the fixed gear so as to eliminate the free angular displacement of the gears with respect to each other within backlash and to preclude tooth disengagement under axial forces which are imposed on the floating gear by external peripheral loads.

Due to the urging by the preloading means of the floating gear against the fixed gear, the teeth of the first toothed portion of the floating gear intermesh with the teeth of the first toothed portion of the fixed gear and the teeth of the second toothed portion of the floating gear intermesh with the teeth of the second toothed portions of the fixed gear along the opposite tooth flanks with respect to each other.

As the teeth of the first toothed portions of the gears are cut at a different inclination angle than the teeth of the second toothed portions of the gears, the loading on the gears is distributed with the toothed portion having the lesser inclination angle taking-up the overall transmitted load and with the toothed portion having the greater inclination angle serving to prevent free angular displacement of the gears with respect to each other within backlash thereby eliminating teeth hammering. The peripheral forces which arise due to the tendency of the teeth to separate subsequent to acceleration of the driven gear are taken-up by the toothed portion having the greater inclination angle in a direction opposite to the transmitted load.

The first and second inclination angles at which the teeth are cut in the first and second toothed portions of each gear are selected in relationship to the peripheral forces applied to the first and second toothed portions so that the axial preloading thrust is sufficient to balance and oppose the reaction forces imposed on the floating gear and maintain engagement of the gear teeth, but not so excessive as to cause unnecessary tooth wear due to overpressure during tooth engagement. When high dampling and compactness are desired, the greater inclination angle is set at a value of 90° and the lesser inclination angle preselected at a value in range from at least 45° to less than 90°.

Additionally, it is preferred that the toothed portion of at least one of the meshing gear portions having the greater inclination angle is manufactured with a vibration and noise damping or dissipating material such as powered metal or plastics.

Further, at least one of the gears is preferably comprised of first and second toothed portions which are angularly displaceable with respect to other whereby the first and second toothed portions of the gear may be selectively positioned about the shaft with respect to each other so as to provide mutual compensation of the cyclical variations of gear ratio which unavoidably occur due to variations in teeth in the manufacturing process.

Also, the number of teeth cut into the first toothed portion and the number of teeth cut into the second toothed portion of each gear are selected to be at different numbers such that the ratio of the number of teeth cut in the two portions is not an integer. Also, the number of teeth cut in the first portion of the floating gear and in the second portion of the floating gear are respectively related to the number of teeth cut in the first portion of the fixed gear and in the second portion of the fixed gear such that the gear ratio between the first toothed portions of the gears and the gear ratio between the second toothed portions of the gears are at the same whole number value.

BRIEF DESCRIPTION OF THE DRAWINGS

The invention will be more particularly described in the following discussion of the preferred embodiments thereof with reference to the accompanying drawing, wherein.

DESCRIPTION OF THE PREFERRED EMBODIMENTS

Figure 1:
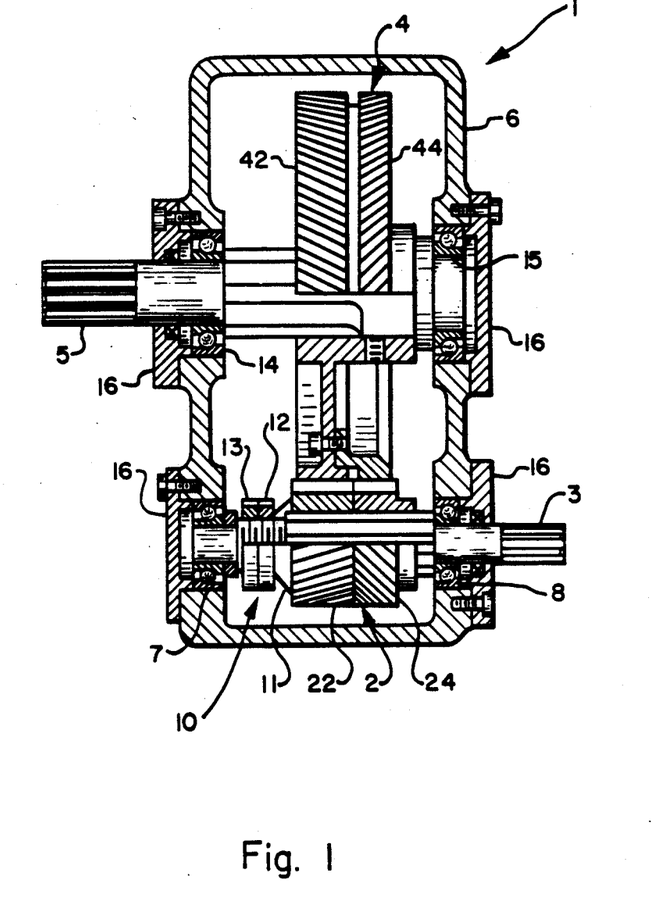
FIG. 1 is an elevational view, partly in section, showing a gear housing incorporating the inventive concept hereof for the high-speed transmission between parallel shafts.

Referring now to FIG. 1, there is depicted therein a gear assembly 1 for the high-speed transmission between two parallel shafts 3 and 5, one of which is a drive shaft and the other of which is a driven shaft. The gear assembly 1 comprises first and second meshing gears 2 and 4 enclosed within housing 6 and mounted respectively to the shafts 3 and 5 with the first gear 2 being mounted so as to be axially movable along the shaft 3 and with the second gear 4 being fixedly mounted to the shaft 5 by means well known in the art. Shafts 3 and 5 are each rotatably supported along parallel axes by bearings 7 and 8 and 14 and 15, respectively, mounted in the housing 6 and secured therein by end caps 16 bolted to the housing 6. Bearings 7 and 15 are combined axial and radial thrust type bearings chosen to be capable of withstanding axial load, while bearings 8 and 14 need only be pure radial thrust type bearings.

The gears 2 and 4 are disposed along their respective shafts 3 and 5 such that their teeth intermesh. Preloading means 10 is disposed on the shaft 3 between the axial and radial thrust bearing 7 and the floating gear 2 to provide an axial preloading thrust against the floating gear 2 so as to urge the floating gear 2 towards the fixed gear 4 mounted to shaft 5. The preloading means 10 comprises a resilient element 11, such as a spring-type cup washer or elastic pads, and adjustments means comprising tension nut 12 and lock nut 13. By rotating the tension nut 12 and lock nut 13 the compression on the resilient element 11 may be changed thereby adjusting the preloading thrust on the floating gear 2.

Each of the gears 2 and 4 are formed of coaxially disposed first and second assymetric toothed portions 22 and 24 and 42 and 44 respectively. The gears may be formed of two asymmetrically toothed portions cut on separate blanks as illustrated in FIG. 1, or they may be formed of two asymmetric toothed portions cut on a single blank. With the first and second toothed portions 42 and 44 being cut on separate blanks, the toothed portion 42 and 44 may be angularly displaceable with respect to each other. As shown in FIG. 1, the second toothed portion 44 of gear 4 is rotatable about the shaft 5 to be selectively angularily displaceable with respect to the first toothed portion 42 of gear 4. Once positioned angularly with respect to the first toothed portion 42, the second toothed portion 44 is locked into position by attachment to the first toothed portion 42 of gear 4.

By the term "asymmetric", it is meant that the first and second toothed portions of each of the gears have teeth cut therein having different helix angles. That is, the helical angle of the teeth 32 of the first toothed portion 22 of the floating gear 2 is different from the helix angle of teeth 34 of the second toothed portion 24 of the floating gear 2. Similarly, the helix angle of the teeth 52 of the first toothed portion 42 of the fixed gear 4 is different from the helix angle of teeth 54 of the second toothed portion 44 of the fixed gear 4. The teeth 32 and 34 and the teeth 52 and 54 although having different helix angles may be of the same direction in pitch or of the opposite direction in pitch as illustrated in FIG. 1.

Additionally, the helix angles of the teeth 32 and 34, and the teeth 52 and 54, are selected such that the ratio of the tangent of the helix angle of the teeth 32, 52 respectively on the first toothed portions 22 and 42 to the tangent of the helix angle of the teeth 34, 54 respectively on the second toothed portions 24 and 44 is substantially equal to the ratio of the magnitude of the peripheral forces on the second toothed portion to the magnitude of the peripheral forces on the first toothed portion.

Figure 2:
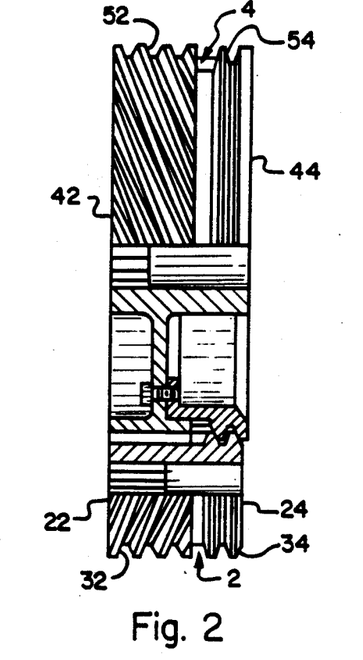
FIG. 2 is an alternate embodiment of the meshing gear grouping of FIG. 1.

In FIG. 2, the helix angle of the teeth 32 on the first portion 22 of the floating gear 2 is selected to be at least 45° and less than 90° while the helix angle of the teeth 34 on the second portion 24 of the floating gear 2 is selected to be equal to 90°. Similarly, the helix angle of the teeth 52 on the first portion 42 of the fixed gear 4 is selected to be at least 45° and less than 90° while the helix angle of the teeth 54 on the second portion 44 of the fixed gear 4 is selected to be equal to 90°. In this range of values for the helix angle, the friction between intermeshing teeth provide a damping capability.

Figure 3:
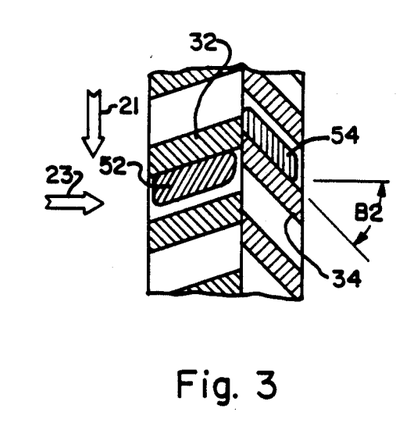
FIG. 3 is a diagrammatic illustration of the engagement of the teeth of the gear assembly of FIG. 1 wherein the teeth of the two toothed portions of each gear have the opposite pitch.
Figure 4:
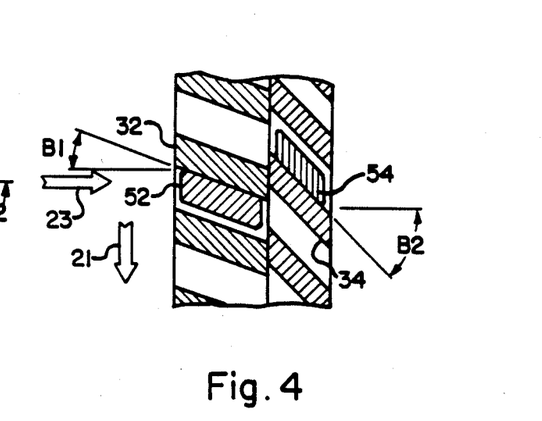
FIG. 4 is a diagrammatic illustration of the engagement of the teeth of the gear assembly of FIG. 1 wherein the teeth of the two toothed portions of each gear have the same pitch.

The engagement of the teeth in the gear assembly of the invention is diagrammatically illustrated in FIGS. 3 and 4 for the gear assembly embodied in FIG. 1 with the teeth of the two tooth portions of each gear being pitched in opposite directions in FIG. 3 and being pitched in the same direction in FIG. 4. The engagement of the teeth of the gearing of FIG. 2 is similarly illustrated in FIG. 5.

Figure 5:
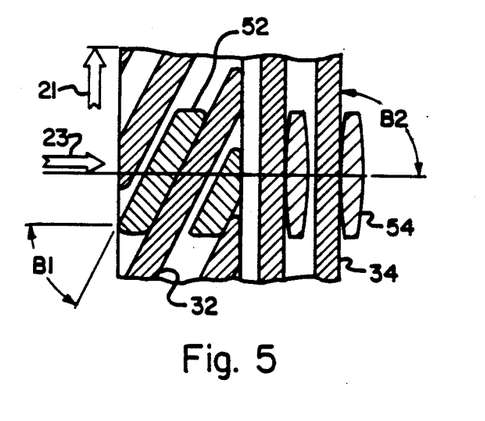
FIG. 5 is a diagrammatic illustration of the engagement of the teeth of the gear grouping of FIG. 2.

In the FIGS. 3, 4 and 5, the arrow 21 indicates the direction of the rotation of the floating gear 2, the arrow 23 indicates the direction of the axial preloading thrust applied to the floating gear 2, $\beta 1$ represents the lesser pitch helix angle, which is associated with the teeth 32 and 52 of the first toothed portions of each of the gears, and $\beta 2$ represents the greater helix angle, which is associated with the teeth 34 and 54 of the second toothed portions of each of the gears.

Referring now to FIG. 3, the axial preloading force 23 urges the floating gear 2 against the fixed gear 4 so that tooth 32 engages the tooth 52 of the fixed gear with the flank which is opposite to the flank of tooth 34 which engages the tooth 54 of the gear 4 whereby free angular displacement of the gears within backlash is prevented and the possibility of hammering is eliminated. The axial reactions generated by the engagement of the teeth 32, 34 of the floating gear 2 with the teeth 52, 54 of the fixed gear 4 at their contacting surface is opposed and balanced by the axial preloading thrust 23. Due to the opposite pitch of the teeth on the two toothed portions of each gear, these engagement reactions act in the same direction and alternatively oppose the axial preloading thrust 23 which is accordingly selected to counter balance the larger of these engagement reactions and thereby prevent teeth separation at the working surfaces and ensure no contact between the unworking surfaces of the teeth. The permanent separation of non-working teeth flanks reduces the generation of noise due to the discharge of air and oil trapped in the mesh.

If an external force, such as transmitted load, is applied to the tooth 32 of the first portion against the direction of rotation indicated by the arrow 21, the axial thrust on tooth 32 is increased so as to automatically unload the engagement of teeth 34 and 54. Similarly, if an external force is applied to the tooth 34 of the second toothed portion in the direction of the rotation, the axial thrust on tooth 34 will lead to unloading the engagement of teeth 32 and 52.

In order to prevent tooth separation under external loading, the axial preload must be selected to be equal to or greater than the maximum axial component of the external peripheral loads applied to the teeth. In order to prevent overloading of the teeth by an axial preload, the ratio of the tangent of the greater helix angle $\beta 2$ to the tangent of the lesser helix angle $\beta 1$ is chosen to be substantially equal to the ratio of the peripheral load on the tooth 32 on the first portion of the gear to the peripheral load on the tooth 34 on the second portion of the gear. The peripheral loads on the first and second portions of the gear are determined analytically and/or emphirically to calculate the ratio upon which the helix angles $\beta 1$ and $\beta 2$ will be selected. The axial preloading thrust can be adjusted once the gear assembly is in operation to compensate for any inaccuracy in determining the peripheral loads upon which the ratio is calculated In the embodiment shown in FIG. 4 wherein the teeth of the first and second toothed portions of the gear have the same pitch direction, the application of an external force to the tooth 32 of the first portion of the gear against the direction of rotation will result in a wedging of rather than an unloading and separation of teeth 34 and 54, while the application of an external force to the tooth 34 of the second portion of the gear in the direction of the rotation will again result in an unloading and separation of the teeth 32 and 52. Therefore, the axial preloading force which should be applied to prevent separation need only be equal to the maximum component of the external peripheral load applied to tooth 34.

The difference in helical angles, $\beta E2 - \beta 1$, should be large enough to avoid a jamming of the teeth 32, 34 by the teeth 52, 54 due to excessive frictional forces on the teeth during engagement. Accordingly, the difference in helix angles, $\beta 2 - \beta 1$, must be greater than the equivalent angle whose tangent is the sum of the coefficients of friction between both sets of meshing teeth and also the coefficient of friction of the floating gear 2 along its shaft.

In the embodiment shown in FIG. 5 wherein the helix angle $\beta 2$ of the teeth of the second toothed portion equal 90° and the helix angle $\beta 1$ of the teeth of the first toothed portion is less than 90°, both sets of engaging teeth 32, 52 and 34, 54 are involved in load transmission from the gear 2 to the gear 4. The thrust 23 meshes the teeth 34 of the second portion of the gear 2 with the teeth 54 of the second portion of the gear 4. A peripheral load applied to tooth 32 on the first portion of gear 2 against the direction of rotation will also cause an axial force meshing the teeth 34 of the floating gear with the teeth 54 of the fixed gear. This axial force will exceed the corresponding peripheral load because of the large magnitude of the helix angle $\beta 1$. Together with the thrust 23, this axial force provides a friction engagement of the teeth 34 and 54 which will transmit a portion of the external load. The friction engagement of the teeth 34 with the teeth 54 caused by the thrust 23 also serves to resist the unmeshing of the teeth 32 and 52 subsequent to acceleration of the driven gear and thereby provide a damping action on the gearing.

Additionally, if the magnitude of helix angle $\beta 1$ is selected in the preferred range of from at least 45° to less than 90° a smooth and quiet operation of the first toothed portions can be attained with a reduced number of teeth thereby enabling a compact gear assembly construction with a large gear ratio.

The difference in helix angles $\beta 2-\beta 1$ should be selected to be large enough to avoid the jamming of the teeth 32, 34 by the teeth 52, 54, respectively, due to excessive frictional forces on the teeth during engagement. Accordingly, the difference $90-\beta 1$ should be greater than the equivalent angle whose tangent is equal to the sum of the coefficients of friction between tooth sets of the meshing gears.

Figures 6, 7:
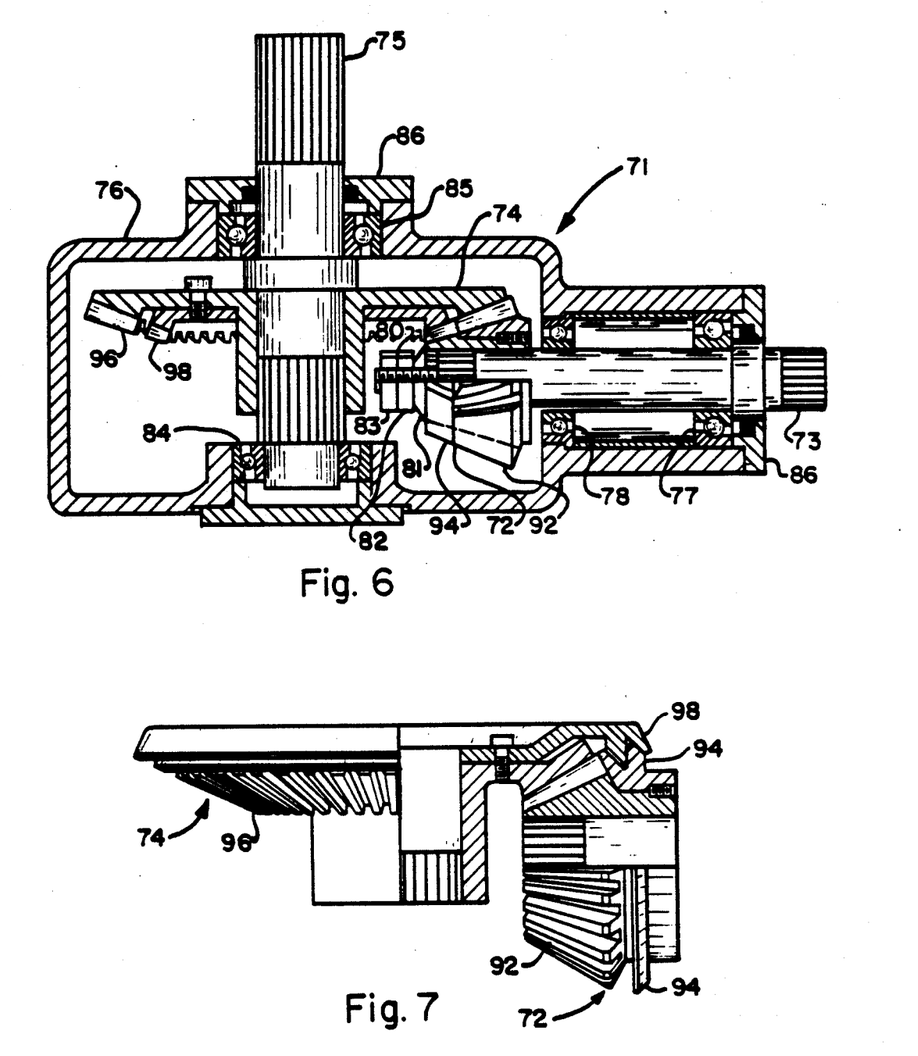
FIG. 6 is an elevational view, partly in section, showing a gear housing incorporating the inventive concept hereof for the highspeed transmission between intersecting shafts.
FIG. 7 is an alternate embodiment of the meshing gear grouping of FIG. 6.

Referring now to FIG. 6, there is depicted therein a gear assembly 71 for the high-speed transmission between two intersecting shafts 73 and 75, one of which is a drive shaft and the other of which is a driven shaft. The gear assembly 71 comprises first and second meshing gears 72 and 74 enclosed within housing 76 and mounted respectively to the shafts 73 and 75 with the first gear 72 being mounted so as to be axially movable along the shaft 73 and with the second gear 74 being fixedly mounted to the shaft 75. Shafts 73 and 75 are each rotatably supported on intersecting axes by bearings 77 and 78 and 84 and 85, respectively, mounted in the housing 76 and secured therein by end caps 86 bolted to housing 76. Bearings 77 and 85 are combined axial and radial thrust type bearings chosen to be capable of withstanding axial load, while bearings 78 and 84 need only be pure radial thrust type bearings.

The gears 72 and 74 are disposed along their respective shafts 73 and 75 such that their teeth intermesh. Preloading means 80, comprising a resilient spring-type cup washer 81 and tension nut 82 and lock nut 83, is disposed on the shaft 73 so as to urge the floating gear 72 towards the fixed gear 74 mounted to the shaft 75.

The first gear 72 is comprised of first and second toothed bevel portions 92 and 94 which are connected together to be rotatably displaceable with respect to each other and are axially displaceable along the shaft 73. Both the first and second toothed bevel portions 92 and 94 have the same pitch cone but the teeth cut in the first toothed bevel portion 92 are cut at a different spiral angle than the teeth cut in the second toothed bevel portion 94. Additionally, the bevel portions 92 and 94 may have a different number of teeth.

The second gear 74 also comprises first and second toothed portions 96 and 98 which are mounted coaxially on the shaft 74 and are angularily displaceable with respect to each other. The first and second toothed portions 96 and 98 are again asymmetric in that the teeth cut in the first portion 96 are cut at a different angle than the teeth cut in the second portion 98.

An alternate embodiment of gear grouping 71 of FIG. 6 is shown in FIG. 7. As depicted therein, the first toothed portion 92 of the first gear 72 and the first toothed portion 96 of the second gear 74 have spiral teeth cut therein, while the second toothed portion 94 of the first gear 72 and the second toothed portion 98 of the second gear 74 have teeth cut at an angle of inclination of 90° to their respective shafts.

Figure 8:
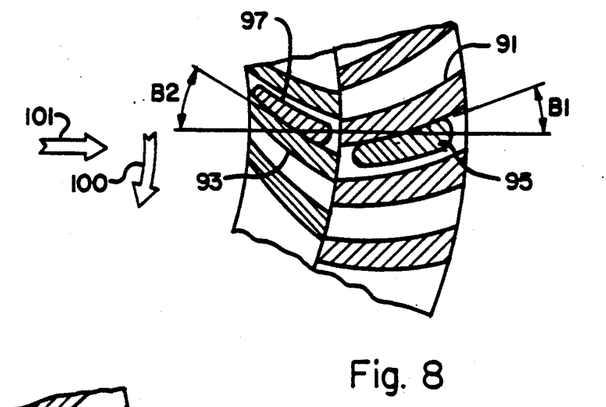
FIG. 8 is a diagrammatic illustration of the engagement of the teeth of the gear assembly of FIG. 6 wherein the teeth of the two toothed portions spiral in opposite directions.
Figure 9:
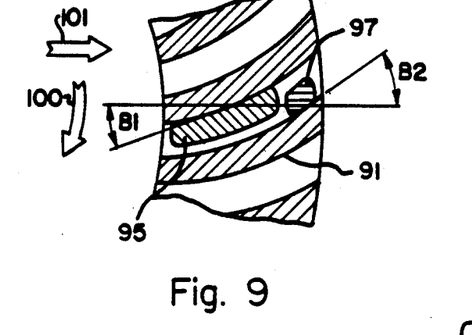
FIG. 9 is a diagrammatic illustration of the engagement of the teeth of the gear assembly of FIG. 6 wherein the teeth of the two toothed portions of each gear spiral in the same direction.
Figure 10:
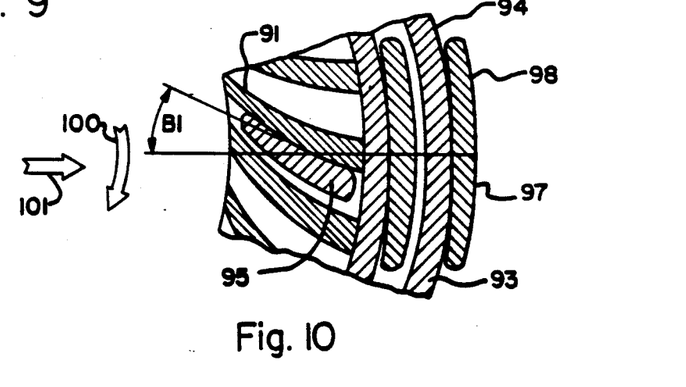
FIG. 10 is a diagrammatic illustration of the engagement of the teeth of the gear grouping of FIG. 7.

The engagement of the teeth in the gear assemblies of the present invention is diagrammatically illustrated in FIGS. 8 and 9 for the gear grouping shown in FIG. 6 and in FIG. 10 for the gear grouping embodiment shown in FIG. 7. In the engagement shown in FIG. 8, the lesser spiral angle is on the toothed portions 92 and 96 and the teeth on the first and second toothed portions are cut in opposite directions. In FIG. 9 the lesser spiral angle is on the toothed portion 98 of the fixed gear and the teeth on both toothed portions thereof are cut in the same direction, while the floating gear has a uniform tooth pattern In FIG. 10, the angle $\beta 2$ is 90°.

In FIGS. 8, 9 and 10, the arrow 100 indicates the direction of the rotation of the floating gear 72, and the arrow 101 indicates the direction of the axial preloading thrust applied to the floating bevel gear 72, $\beta 1$ represents the spiral angle at the contact point of the teeth 91 cut in the first toothed bevel portion 92 of the first gear 72 and also the teeth 95 cut in the first toothed portion 96 of the second gear 74, and $\beta 2$ represents the spiral angle at the contact point of the teeth 93 cut in the second toothed bevel portion 94 of the first gear 72 and also the teeth 97 cut in the second toothed portion 98 of the second gear 74.

The operation of the gear assemblies of FIGS. 6 and 7 as illustrated in FIG. 8,9 and 10 is similar to the previously described operation of the gear assemblies of FIGS. 1 and 2 as illustrated in FIGS. 3, 4 and 5. The reactions generated by the application of peripheral loads during the engagement of the gear teeth as shown in FIG. 8 is balanced and opposed by the axial preloading thrust in a manner similar to that described previously with respect to the engagement of the teeth of the gear assembly for transmission between parallel shafts as illustrated in FIG. 3. Likewise, the reactions generated by the application of peripheral loads during the engagement of the gear teeth as shown in FIG. 9 is balanced and opposed by the axial preloading thrust in a manner similar to that described previously with respect to the engagement of the teeth of the gear assembly for transmission between parallel shafts as illustrated in FIG. 4. Similarly, the reactions generated by the application of peripheral loads during the engagement of the gear teeth as shown in FIG. 10 is balanced and opposed in a manner similar to that described previously with respect to the engagement of the teeth of the gear assembly for transmission between parallel shafts as illustrated in FIG. 5.

In the tooth engagement illustrated in FIG. 9, both tooth formations are cut in the same direction and one of the gears is formed on a single blank rather than of two distinct portions as the other gear. This specific embodiment, which results in a cost savings, is made possible without departing from the invention by cutting the teeth 91 in the gear with a continuously varying spiral angle. The first and second portions of the second gear are angularily displaceable with respect to each other and are adjusted such that the teeth 95 and 97 of the first and second portions thereof, respectively, engage the tooth 91 of the first gear on opposite sides thereof and at points of differing spiral angle along tooth 91. The teeth engagement obtained in this manner results in reactions balanced and opposed by the axial preloading thrust as described with respect to FIG. 4.

As described previously with respect to transmission between parallel shafts, it is necessary to preselect the values for $\beta 2$ with respect to $\beta 1$ based on expected peripheral loads in order to effectively provide for the balancing of these peripheral loads by the axial preloading thrust but prevent tooth overloading. In the case of transmission between intersecting shafts, i.e. for the gear assembly of FIG. 6 wherein the gears have oppositely pitched toothed portions, the angle $\beta 2$ and the axial preloading force are selected based not only on analytically and/or emphirically determined values for peripheral loads, but also on the pitch angle of the floated bevel gear and the tooth pressure angle through the following relationships:

$$\tan \beta 2 = \frac{K\frac{W_1}{W_2} + C\sqrt{\left(K\frac{W_1}{W_2}\right)^2 + (1 - C^2)}}{1 - C^2}$$

and $$A = K W_1 \cos \gamma$$

where

A is the axial preloading force;
$W_1$, $W_2$ are the total peripheral forces applied to the first and to the second toothed portions respectively;
$\phi$ is the normal tooth pressure angle; is the pitch angle of the bevel gear;
C equals $(\tan \phi)(\tan \gamma)$; and
K equals $(\tan \beta 1) \pm (C/\cos \beta 1)$.

The sign of the term $(C/\cos \beta 1)$ in the expression for K depends on the direction of the gear's rotation and the pitch direction. For the embodiment shown in FIG. 8, the sign is minus. From these relationships, the spiral angle $\beta 2$ and the axial preloading force can be determined in order to balance and oppose the external peripheral forces.

The spiral angle $\beta 1$ is chosen in accordance with standard procedures for conventional bevel gearing. For a typical value of $\beta 1$ of 30° and for $W_1/W_2 = 3$, $\phi = 20°$ and $\gamma = 30°$, the value of B2 calculated via the above expression would be approximately 53.5°.

Further in accordance with the present invention, the gear assemblies of FIG. 1 for transmission between parallel shafts and the gear assemblies of FIG. 6 for transmission between intersecting shafts can be provided with additional noise reduction capability by proper selection of the number of teeth on the first and second toothed portions, by proper material selection in the manufacturing, and/or by proper angular positioning of the first and second toothed portions with respect to each other.

Accordingly, the number of teeth on the first toothed portion of each gear and the number of teeth on the second toothed portion are selected so as to be non-multiple with respect to each other. That is, the ratio of the number of teeth on the first portion of the gear to the number of teeth on the second portion of the gear is a non-integer. Additionally, the number of teeth on the first and second portions of the mating gears are chosen so that the interengaging portions have the same whole number gear ratio.

Further, vibration and noise damping or dissipating materials, such as powdered metals and various plastic materials, may be used in manufacturing the gear assemblies. In accordance with the present invention, the toothed portion of the gears having the greater inclination angle (i.e., the greater helical or spiral angle) is formed of or at least coated with a vibration/noise damping or dissipating material while the toothed portion of the gear having the lesser inclination angle, i.e. the portion of the gear carrying the greater load, is made of standard, conentional load carrying materials. For example, in the embodiment of the gear assembly shown in FIG. 1, at least one of the toothed portions 24 and 44 would be constructed of a vibration/noise damping or dissipating material. Similarly, in the embodiment of the gear assembly shown in FIG. 6, at least one of the toothed portions 92 and 96, having the greater spiral angle, would be constructed of a vibration/noise damping or dissipating material.

In accordance with the present invention, at least one of the meshing gears of the gear assembly of the present invention, whether for use in transmission between parallel shafts or intersecting shafts, is made of first and second toothed portions which are angularly displaceable with respect to each other. By proper rotation of one toothed portion with respect to the other, the angular relationship between the teeth of the first and second toothed portions can be adjusted to mutually compensate for cyclic teeth variations and periodic gear ratio variations thereby lessening vibration and noise. For example, in the gear assembly of FIG. 1 for transmission between parallel shafts, the second toothed portion 44 of the gear 4 is rotable about its shaft to be angularly adjustable with respect to the first toothed portion 42 thereof. to adjust the angular position thereof, the second toothed portion 44 is unbolted from the first toothed portion 42, then rotated about the shaft 5 to the desired angular position with respect to the first toothed portion 42, and then rebolted to the first toothed portion 42 to fix the new angular positioning therebetween.

I claim:

1. A gear assembly for transmission between two shafts having intersecting axes, one a drive shaft and the other a driven shaft, comprising:

a. two meshing bevel gears, one mounted to said drive shaft and one to said driven shaft, each of said gears having coaxially disposed first and second toothed portions having the same pitch cone, the first and second toothed portions of each of said gears affixedly attached to each other forming together an integral toothed member, the teeth of the first toothed portion of each gear being cut at a first inclination angle and the teeth of the second toothed portion thereof being cut at a second inclination angle different from the first inclination angle, the first toothed portions of said gears having interengaging teeth and the second toothed portions of said gears having interengaging teeth thereby establishing a mating relationship between said gears whereby a driving relationship is established between said shafts, one of said gears being axially displaceable along its axis said first inclination angle B1 and said second inclination angle B2 being preselected such that:

$$\tan \beta 2 = \frac{K\frac{W_1}{W_2} + C\sqrt{\left(K\frac{W_1}{W_2}\right)^2 + (1 - C^2)}}{(1 - C^2)}$$

Where:

$C = (\tan\phi)\cdot(\tan \gamma)$ and $K = \tan \beta 1 + (C/\cos \beta 1)$, $W_1$ and $W_2$ being the peripheral loads applied to the first toothed portion and to the second toothed portion respectively, $\phi$ being the normal tooth pressure angle, and γ being the pitch angle of the floating gear; and b. preloading means engaging said displaceable gear for applying an axially directed load to said displaceable gear to urge said displaceable gear against said other gear while allowing said displaceable gear to float during operation.

2. A gear assembly as recited in claim 1 wherein the preloading means comprises a resilient element and adjustment means operatively associated with the resilient element for changing the compression on the resilient element, the resilient element disposed about the shaft between the adjustment means and the displaceable gear and engaging the displaceable gear so as to rotate therewith.

3. A gear assembly as recited in claim 2 wherein the resilient element comprises an elastic member having damping capacity.

4. A gear assembly as recited in claim 1 wherein the teeth of the first toothed portion are cut along a longitudinal curve with $\beta1$ being the mean spiral angle of the longitudinally curved teeth of the first toothed portion, and the teeth of the second toothed portion are cut along a longitudinal curve with $\beta2$ being the mean spiral angle of the longitudinally curve teeth of the second toothed portion, the teeth of the first and second toothed portions being of opposite pitch to each other.

5. A gear assembly for transmission between two shafts having intersecting axes, one a drive shaft and the other a driven shaft, comprising:

a. two meshing bevel gears, one mounted to said drive shaft and one to said driven shaft, each of said gears having coaxially disposed first and second toothed portions having the same pitch cone, the first and second toothed portions of each of said gears affixedly attached to each other forming together an integral toothed member, the teeth of the first toothed portion of each gear being cut at a first inclination angle and the teeth of the second toothed portion thereof being cut at a second inclination angle different from the first inclination angle, the first toothed portions of said gears having interengaging teeth and the second toothed portions of said gears having interengaging teeth thereby establishing a mating relationship between said gears whereby a driving relationship is established between said shafts, one of said gears being axially displaceable along its axis the second inclination angle of each of said gear having a value of 90° and the first inclination angle of each of said gears having a value less than 90° and b. preloading means engaging said displaceable gear for applying an axially directed load to said displaceable gear to urge said displaceable gear against said other gear while allowing said displaceable gear to float during operation.

* * * * *

UNITED STATES PATENT AND TRADEMARK OFFICE
CERTIFICATE OF CORRECTION

PATENT NO. : 4,719,813
DATED : January 19, 1988
INVENTOR(S) : Lazar Chalik

It is certified that error appears in the above—identified patent and that said Letters Patent is hereby corrected as shown below:

Column 1, line 62, "brasing" should read --biasing--.

Column 3, line 7, "dampling" should read --damping--.

Column 3, line 15, "powered" should read --powdered--.

Column 6, line 36, "$\beta E2$" should read --$\beta 2$--.

Column 9, line 32, "B2" should read --$\beta 2$--.

Column 10, line 49, Claim 1, "B1" should read --$\beta 1$--, and "B2" should read --$\beta 2$--.

Column 10, line 64, Claim 1, "$K = \tan\beta 1 + (C/\cos\beta 1)$" should read --$K = \tan\beta 1 \pm (C/\cos\beta 1)$--.

Signed and Sealed this

Twenty-second Day of November, 1988

Attest:

DONALD J. QUIGG

*Attesting Officer*     *Commissioner of Patents and Trademarks*